United States Patent [19]

Nordling

[11] 3,786,280

[45] Jan. 15, 1974

[54] PULSE SAMPLING AND RESHAPING CIRCUIT

[75] Inventor: Frederik Nordling, Sausalito, Calif.

[73] Assignee: Lynch Communication Systems, Inc., San Francisco, Calif.

[22] Filed: Dec. 20, 1971

[21] Appl. No.: 210,094

Related U.S. Application Data

[63] Continuation of Ser. No. 21,442, March 20, 1970.

[52] U.S. Cl. .................................. 307/268, 307/300

[51] Int. Cl. .......................................... H03k 17/00

[58] Field of Search..................... 307/235, 309, 268, 307/300

[56] References Cited

UNITED STATES PATENTS

| | | | |
|---|---|---|---|
| 2,906,982 | 9/1959 | Jones, Jr. | 307/300 X |
| 3,470,391 | 9/1969 | Granger | 307/300 X |
| 3,210,570 | 10/1965 | Brock et al. | 307/236 |
| 3,144,563 | 8/1964 | Cohler et al. | 307/300 |
| 3,312,839 | 4/1967 | Briley | 307/267 |

*Primary Examiner*—John W. Huckert
*Assistant Examiner*—B. P. Davis
*Attorney*—Melin et al.

[57] ABSTRACT

In a system for the transmission of information coded in terms of the presence and polarity of pulses in a signal pulse train, a circuit for reconstituting degraded pulses comprising a source of degraded input pulse signals to be sampled and reshaped and diode means connected back-to-back between the input signal source and a point of zero potential. Means is provided for maintaining at least one or the other of the diode means in forward biased condition at different potentials of the input pulse signals. First, second and third transistor means are also provided with means connecting the control element of the first transistor means to the input signal source. Means is provided for connecting the control element of the second transistor means to the point of zero potential and means is provided for connecting the control element of the third transistor means to the interconnection of the diode means. The transistor means is connected so as to cause only the transistor means with the highest potential at its base to conduct and sampling pulse source means is connected to the transistor means so as to prevent conduction of any of said transistor means except in the presence of a sampling pulse. Finally, the first transistor means conducts during the sampling pulse when the potential of the input signal pulse at the moment of sampling is more positive than a predetermined positive threshold value, the second transistor means conducts when the input signal potential is more negative than a predetermined negative threshold value, and the third transistor means conducts when the input signal potential is between the threshold values, these threshold values being determined by the voltage drop across the diode means.

4 Claims, 14 Drawing Figures

INVENTOR.
FREDERIK NORDLING
BY
Mellin, Moore + Weissenberger
ATTORNEYS

INVENTOR.
FREDERIK NORDLING
BY
Mellin, Moore + Weissenberger
ATTORNEYS

PULSE SAMPLING AND RESHAPING CIRCUIT

REFERENCE TO RELATED CASES

This case is a continuation of application Ser. No. 21,442, filed Mar. 20, 1970, and entitled "PULSE SAMPLING AND RESHAPING CIRCUIT", now abandoned.

BACKGROUND OF THE INVENTION

A pulse sampling and reshaping circuit for repeaters for pulse code modulated (PCM) telephone lines is disclosed in the copending application Ser. No. 210094, filed Dec. 20, 1971, and entitled SAMPLING AND RETIMING CIRCUIT FOR PCM REPEATERS. Although the circuit of that copending application is effective for accomplishing the intended purpose, operational conditions make it highly desirable to reduce both the area of indecision of the circuit and its power consumption to a minimum.

SUMMARY OF THE INVENTION

The present invention provides a considerably simplified dual limit detector circuit in which the area of indecision of the circuit is narrowed considerably by providing capacitive bridging across the base-emitter circuit of the output transistors, and by increasing the angle of intersection between the base voltage curves of the three transistors of the dual limit detector. The latter is achieved by a novel network of back-to-back connected diodes. This diode connection also reduces indecision by providing low-impedance base circuits with the attendant advantages of lower base current offset errors and greater gain.

A substantial reduction in power drain is accomplished in the circuit of this invention by driving the sampling pulse shaping circuit with an exponentially decaying pulse instead of a square wave; and also by having most of the transistors in the circuit carry current only during a small fraction of the cycle.

An important feature of this invention is the beneficial use of a transistor properly heretofore considered detrimental. The circuit of this invention makes use of the storage time of the output transistors to keep them saturated after the sampling pulse has died away.

Normally, the storage time is considered to be a limitation of the transistor's ability to respond to abrupt signal variations. In the present circuit, however, this nuisance characteristic is used to replace the complex latching circuits of prior art devices, with an attendant substantial reduction in the cost and complexity of the repeater apparatus.

It is therefore the object of this invention to improve reliability by reducing the area of indecision in dual-limit detector type repeater circuits.

It is another object of the invention to reduce the power requirements of a dual-limit detector type repeater circuit.

It is a further object of the invention to reduce the complexity and cost of dual-limit detector type repeater circuits by taking advantage of the storage time of the output transistors to eliminate complex latching circuits.

DESCRIPTION OF THE PREFERRED EMBODIMENT

The purpose of the sampling and reshaping circuit in a PCM repeater is to receive a train of degraded pulses which have been received from the preceding segment of the transmission line and have been equalized and amplified, but which are still of too rounded a shape to be usable, and to convert these degraded pulses into a train of precisely spaced, rectangular pulses suitable for transmission into the next segment of transmission line.

The circuit carries out this function by sampling the train of degraded pulses momentarily at regular intervals corresponding, approximately, to the peaks of the degraded pulses. If the sample exceeds a predetermined positive threshold value (usually one-half of the rated peak amplitude of the degraded pulses), the circuit triggers the output of a positive pulse of predetermined duration; if it exceeds a predetermined negative threshold value, a negative output pulse is triggered; and if the sample is between the two threshold values, no output is triggered.

The timing is usually provided by a tuned amplifier and limiter driven by the degraded pulses in accordance with conventional practices. The output of the limiter is a square wave having a frequency equal to the basic pulse repetition rate, e. g., 1.544 MHz in the usual PCM telephone systems.

Figure 1:
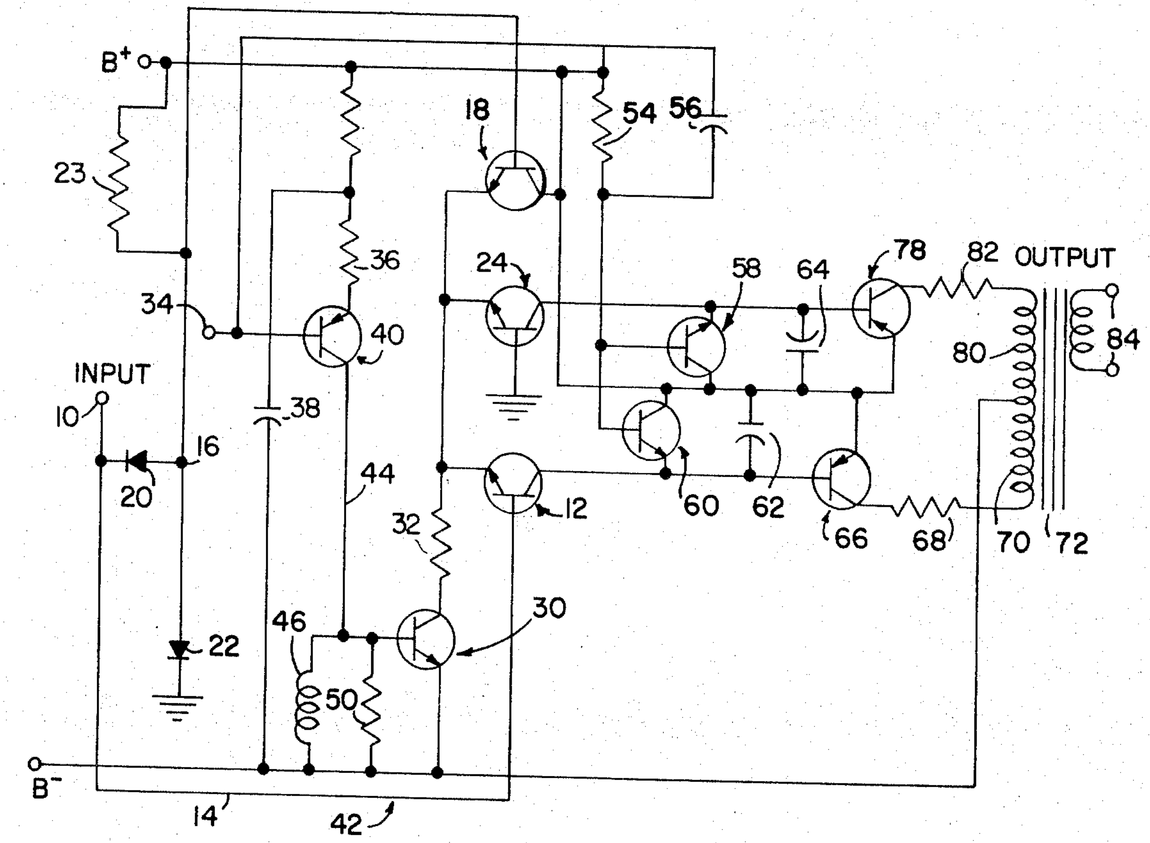
FIG. 1 is a circuit diagram of the circuit of this invention.

The triggering is accomplished in the circuit of this invention by a dual limit detector, whose theory and functioning is described in detail in the aforesaid copending application. In essence, its operation is based on the principle that when three identical n-p-n transistors are connected in parallel, only the one with the highest base potential will conduct. With this in mind, let us now examine the circuit of FIG. 1.

The degraded pulse train which constitutes the input signal applied to input 10 is centered about ground potential. This ground-centered input signal is applied directly to the base of transistor 12 through line 14.

Junction 16, which is connected directly to the base of transistor 18, receives a signal similar to the signal in line 14 but with the positive half wave clipped and with its center offset from ground in the positive direction by the amount of the voltage drop across the diode 20 (for negative values of the input signal) or 22 (for positive values of the input signal). This is true because when the input signal potential is negative, diode 22 is reverse-biased and the potential at junction 16 is the potential in line 14 plus the voltage drop across diode 20. The current through resistor 23 from B+ flows through diode 20, insuring its forward biasing.

Conversely, when the input signal potential is positive, the diode 20 is reverse-biased and the potential at junction 16 is ground potential plus the voltage drop across diode 22. In this condition, the current through resistor 23 forward biases diode 22. The voltage drops across diodes 20 and 22 constitute, respectively, the negative and positive threshold voltages which the amplitude of the input signal applied to input 10 must exceed at the moment of sampling in order to trigger an output pulse in the output circuit.

Figures 2, 2A, 3:
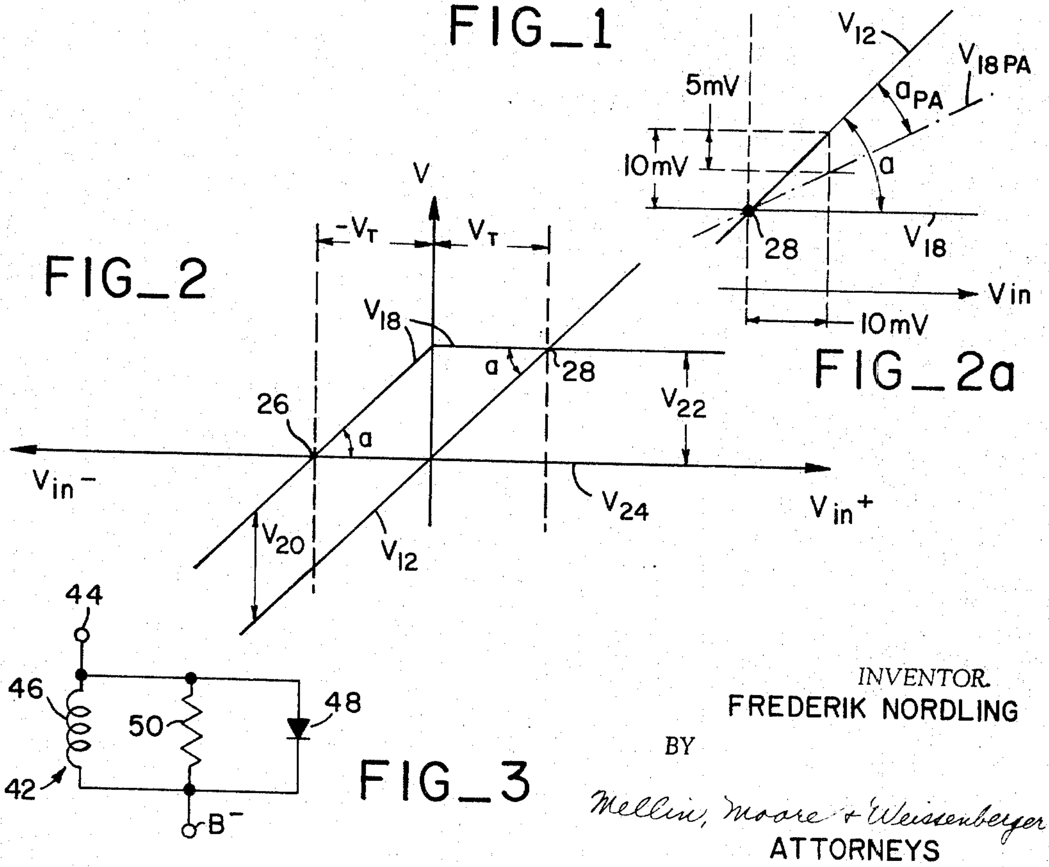
FIG. 2 is a graphical representation illustrating the base bias of the dual-limit-detector transistors at varying input potentials.
FIG. 2*a* is an enlargement of the graphical representation of FIG. 2 in the vicinity of point 28.
FIG. 3 shows an equivalent circuit illustrative of the action of the sampling pulse producing circuit.

The operation of the dual limit detector under these circumstances is illustrated in FIG. 2. In that figure, the line $V_{12}$ represents the variation of the base potential V of transistor 12 as a function of the input signal potential Vhd in. Since $V_{12} = V_{in}$, the line $V_{12}$ bisects the first and third quadrants of the diagram of FIG. 2 at a 45° angle.

Inasmuch as the base of transistor 24 is grounded, $V_{24}$ is always zero and is the abscissa of the diagram.

For negative values of $V_{in}$, the base potential $V_{18}$ of transistor 18 is equal, as explained above, to $V_{in}$ plus the constant voltage drop $V_{20}$ across diode 20. For positive values of $V_{in}$, however, $V_{18}$ is simply equal to the constant voltage drop $V_{22}$ across diode 22.

The resulting broken shape of the $V_{18}$ curve graphically illustrates, as shown in FIG. 2a, the improved discrimination of the circuit resulting from the back-to-back diode combination 20,22. As in the detector of the aforesaid copending application, $V_{24}$ is the most positive for values of $V_{in}$ more negative than $-V_T$, $V_{12}$ is the most positive for values of $V_{in}$ more positive than $V_T$, and $V_{18}$ is the most positive for values of $V_{in}$ between $-V_T$ and $V_T$.

However, in the circuit of the copending application, the line corresponding to $V_{18}$ was a straight line passing through points 26 and 28, whose inclination to the horizontal was arc tan 0.5 or 26.5°.

In the enlarged view (FIG. 2a) of the area immediately to the right of point 28 of FIG. 2, the prior art line has been indicated as $V_{18PA}$. It will be seen that the line $V_{18PA}$ makes an angle $a_{PA}$ of about 18.5° with the line $V_{12}$, whereas the line $V_{18}$ makes an angle $a$ of 45° with the line $V_{12}$.

In other words, a 10 mV change in the input voltage $V_{in}$ from the point 28, where the base voltages on transistors 12 and 18 are exactly equal, resulted, in the device of the copending application, in a voltage differential of 5 mV between the bases of transistors 12 and 18. By contrast, the arrangement of the present invention increases this differential to 10 mV for the same change in the input voltage $V_{in}$. Considering that one source of indecision of the dual limit detector is the insufficiency of the voltage differential between $V_{18}$ or $V_{12\ or\ V24}$ in the vicinity of points 26 and 28, it will be seen that the increase of the intersection angle a due to the diode combination 20, 22 thus substantially reduces the areas of indecision.

To recapitulate, when the input signal at 10 is highly positive, the base of transistor 12 will be more positive than the bases of both transistor 24 (which is grounded) and 18 (which cannot exceed the threshold value $V_{22} = V_T$). When the input signal at 10 is between the positive and negative threshold values $V_T$ and $-V_T$, base 18 is above ground due to the drop across diodes 20 or 22, and hence it is more positive than the grounded base of transistor 12. Consequently, during that time, the base of transistor 18 is the most positive of the three bases. Finally, when the amplitude of the input signal at 10 exceeds the threshold value in the negative direction, the base of transistor 18 is pulled below ground, the base of transistor 12 is highly negative, and the base of transistor 24 remains at the highest level of the three, which is ground.

The emitter-collector circuits of transistors 12, 18, and 24 are switched by transistor 30 through load resistor 32. Consequently, there can be no current flow through transistors 12, 18 and 24 unless the transistor 30 is conducting. Transistor 30 is the sampling pulse producing element of the circuit, and it operates as follows:

The limiter input supplied to the circuit at 34 is shaped as shown in FIG. *4a*. Typically, this input is a square wave with a frequency of 1.544 MHz. The RC network 36, 38 in combination with the p-n-p clipping transistor 40 differentiates the downward transients of the square wave of FIG. 4a into a train of positive collector current spikes spaced 0.648 microseconds apart as shown in FIG. 4b. The exponentially decaying clock spikes of FIG. 4b are supplied to the sampling pulse shaping circuit 42 over line 44.

The operation of the sampling pulse shaping circuit 42 is illustrated in more detail in FIGS. 3 and 5. Referring to FIG. 3, it will be seen that as far as the input 44 is concerned, the sampling pulse shaping circuit 42 consists essentially of an inductor 46 and a diode 48 formed by the base-emitter junction of the transistor 30. The resistor 50 is a damping resistor to prevent ringing of the sampling pulse shaping circuit due to stray capacitances and is disregarded in the following explanation of FIG. 5.

FIG. *5a* shows one of the clock spikes of FIG. *4b* on an expanded time scale. The spike current $I_{44}$ flowing in line 44 is essentially divided between inductance 46 and diode 48 in FIG. 3. At the beginning of the clock spike, the inductance of inductor 46 prevents any current flow through inductor 46, and all of the spike current $I_{44}$ flows through diode 48 which current causes transistor 30 to saturate quickly. As time passes, however, the current $I_{46}$ through the substantially resistance-free inductor 46 gradually increases until $I_{46}$ becomes equal to $I_{44}$.

As shown in FIG. *5b*, the current $I_{48}$ through diode 48 equals $I_{44} - I_{46}$ and takes the form of a spike whose initial amplitude is $I_{44}$, and whose amplitude decays to zero at the intersection of $I_{44}$ and $I_{46}$ in FIG. *5a*. At this point, there is no further current left to flow through the diode 48; in other words, the base-emitter current of transistor 30, which is denoted as $I_{48}$ in FIG. *5a*, drops to zero. With no more base current left, transistor 30 cuts off. FIG. *5c* illustrates the base current $I_{48}$ of transistor 30, which constitutes the sampling pulse.

It will be noted that the sampling pulse producing transistor 30 is driven by a relatively narrow clock spike rather than by the square wave output of the timing multivibrator, as was the case in prior art devices. Inasmuch as the sampling pulse generator 30, unlike the differentiator 36, 38, 40, is a rather high current device requiring considerable base current to operate, it will be seen that the sampling pulse producing transistor 30 of this invention requires considerably less base current energy than prior art devices. This is due to the fact that it requires only the energy of a clock spike of FIG. 4*b* instead of the energy of a square wave half-cycle as illustrated by the shaded area 52 in FIG. 4*b*. The circuit also produces a good rectangular output pulse, which is ideal for operation of the following circuits. Other pulse generators could be designed with low power consumption, but would have non-ideal output waveforms, such as a decaying exponential.

Referring back now to FIG. 1, it will be seen that the square wave signal supplied to input 34 by the timing multivibrator is also differentiated by the RC combination 54, 56. It will be noted that transistors 58, 60 are n-p-n transistors, i.e., they have a polarity opposite to that of clipping transistor 40. Consequently, the effect of the differentiated signals produced by the RC combination 54, 56 will be to render transistors 58, 60 conductive at the upward transient of the square wave of FIG. 4*a*, whereas the clock spikes of FIG. 4*b* were produced at the downward transients of the square wave of FIG. 4*a*.

Figures 5A, 5B, 5C, 5D, 6, 7:
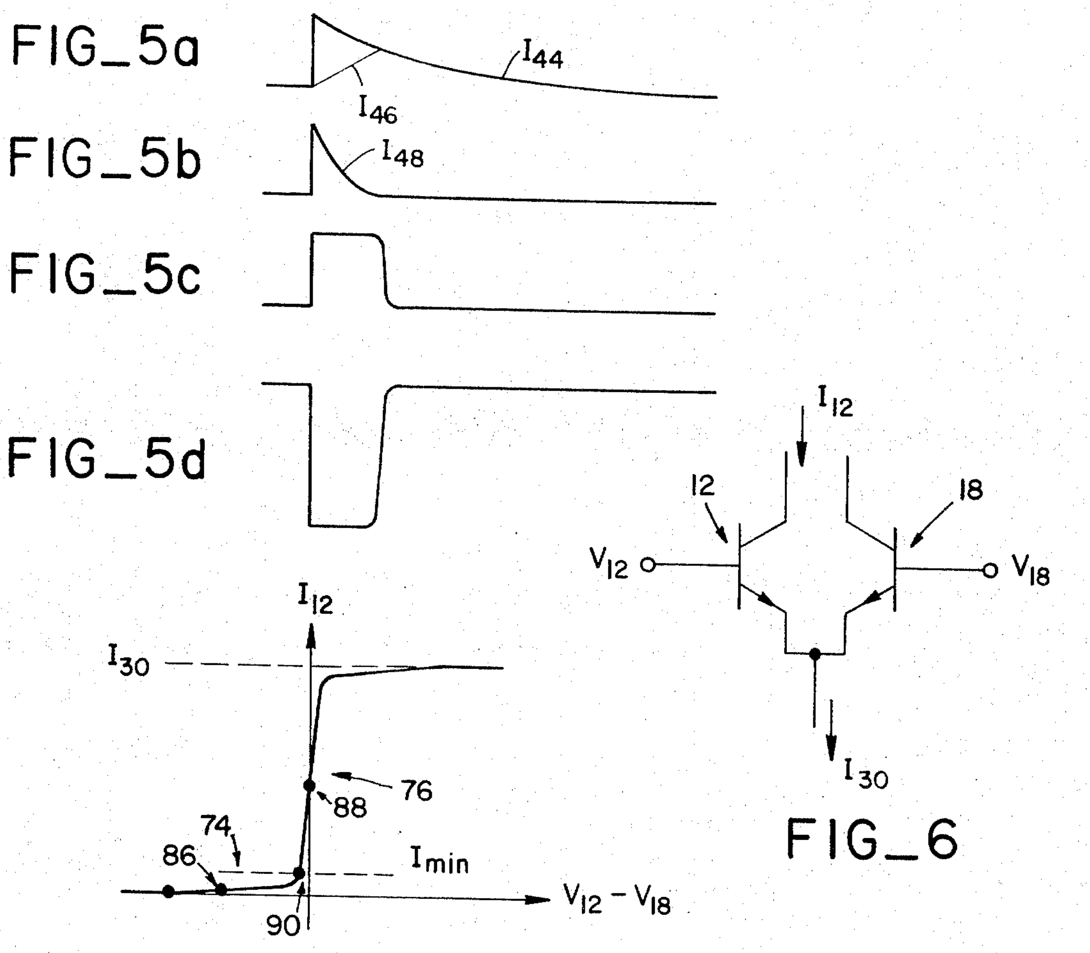
FIG. 5*a*–5*d* shows the voltage waveforms involved in the operation of the sampling pulse producing circuit.
FIG. 6 shows an equivalent circuit illustrating the operation of an individual transistor of the dual limit detector of FIG. 1.
FIG. 7 is a graphical representation of the output current of an individual transistor of the dual limit detector.

During the presence of the sampling pulse of FIG. 5*d*, transistors 58 and 60 are turned off, and the collectors of output triggering transistors 12 and 24 are connected to the positive supply B+ through capacitors 62, 64 respectively. If the input signal at input 10 during the sampling pulse is more positive than $V_T$ so that transistor 12 conducts, the emitter-collector current of transistor 12 will first charge capacitor 62. Not until after the charging of capacitor 62 has proceeded for a finite length of time will the base potential at the base of output transistor 66 drop sufficiently from its original value of about B+ to cause the output transistor 66 to conduct and deliver an output pulse to output transformer 72.

The output transistor 66 rapidly saturates, and it remains saturated when transistor 12 cuts off at the end of the sampling pulse shown in FIG. 5*d*, due to charge storage in the base region of transistor 66. The phenomenon of charge storage in saturated transistors is normally a problem, as it can reduce switching speeds, but here it is used to advantage to keep the transistor 66 in saturation for a desired length of time. The presence of capacitor 62 increases the storage time somewhat and makes the circuit somewhat less dependent on variations in parameters of transistor 66.

The ulilization of the charge storage characteristic to keep the output transistor 66 in saturation after the end of the sampling pulse dispenses with the need for complex latching circuitry and greatly simplifies the operation of the circuit.

Figure 4A:
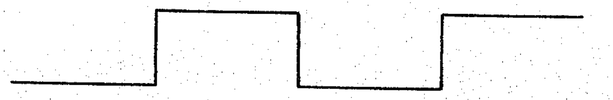
FIG. 4*a*–4*b* shows voltage waveforms at various points in the circuit of FIG. 1.
Figure 4B:
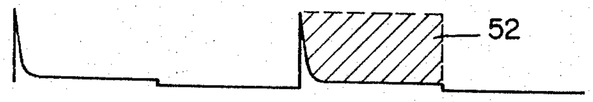

Transistor 60 is connected as an emitter-follower and provides essentially a short circuit between the B− line and the base of output transistor 66 when transistor 60 is turned on by the clock spike representing the differentiated upward transient of the square timing wave of FIG. 4*a*.

It will be seen that the action of transistor 60 and capacitor 62 is to delay the turn-on of output transistor 66, but to provide a sharp cutoff of the same transistor. The reason for the delayed energization of output transistor 66 is found in FIGS. 6 and 7.

Essentially, the combination of transistors 12 and 18 constitutes a differential amplifier circuit as illustrated in FIG. 6. In that figure, the current flowing through transistor 30 is denoted as $I_{30}$, and the current through transistor 12 (which is the current to which output transistor 66 responds) is denoted as $I_{12}$. As the voltage differential $V_{12} - V_{18}$ is varied from the region where $V_{18}$ is strongly more positive than $V_{12}$ to the region where $V_{12}$ is strongly more positive than $V_{18}$, it will be seen from FIG. 7 that the $I_{12}$ curve has a flat portion 74 followed by a steep portion 76. In the absence of the capacitor 62, any current $I_{12}$ through transistor 12 would be sufficient, even in the flat portion of the curve 74, for example at point 86, to produce enough bias at the base of output transistor 66 to turn it on under some conditions such as variations in the parameters of transistor 66, and temperature and load changes. Under other conditions $I_{min}$ might be necessary to turn on transistor 66.

The area of indecision can be seen to be the distance, measured along the abcissa, between points 86 and 90. If $V_{12} - V_{18}$ is in this region, it is uncertain whether transistor 66 is on or off, under varying conditions.

To reduce the area of indecision of the circuit, it is desirable to allow the output transistor 66 to respond to current flow through transistor 12 only after the current flow through transistor 12 reaches the steep portion 76 of the $I_{12}$ curve. The capacitor 62 achieves this result by absorbing, for the duration of the sampling pulse of FIG. 5c, any current $I_{12}$ below the level of $I_{min}$. Not until $I_{12}$ exceeds $I_{min}$ will a sufficient potential drop occur at the base of output transistor 66 during the sampling pulse to cause output transistor 66 to turn on. It will be thus seen that the provision of capacitor 62 greatly reduces the area of indecision of the circuit. Now, the range of $V_{12} - V_{18}$ for which uncertainty exists is the distance between points 90 and 88 measured along the abcissa. This is a substantial reduction. As a practical matter, the reduction in the area of indecision due to the presence of capacitor 62 is about two to one.

Figure 8A:
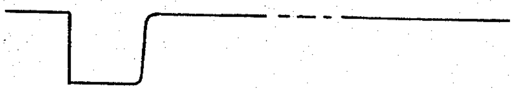
FIG. 8*a*–8*b* illustrates various waveforms associated with the operation of the output transistors.
Figure 8B:
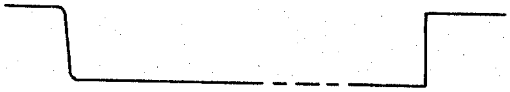

Referring to FIG. 8 in the light of the preceding discussion it will be seen that a pulse through transistor 12 shaped essentially as shown in FIG. 8*a* will produce an output pulse in primary winding 70 having approximately the shape of FIG. 8*b*. Inasmuch as output transistor 66 rapidly saturates after the initial turn-on delay due to the charging of capacitor 62, it is not affected by the gradual discharge of capacitor 62 and remains fully "on" until it is sharply turned off by the energization of transistor 60 which suddenly removes all charge both from the capacitor and the transistor base. As a practical matter, the duration of the pulse of FIG. 8a may be on the order of 50 nanoseconds, whereas the duration of the output pulse of FIG. 8*b* is essentially one-half of the cycle of the square wave timing signal of FIG. 4a or approximately .324 microseconds.

The operation of output transistor 78, capacitance 64 and transistor 58 under the influence of transistor 24 is identical to the operation of the corresponding components associated with the transistor 12. Consequently, the energization of transistor 24 by a strongly negative input signal during a sampling pulse will result in an output pulse being supplied to winding 80 of output transformer 72 through load resistor 82 from output transistor 78.

Inasmuch as the primary winding 70 and 80 of output transformer 72 oppose each other, a pulse through winding 70 will produce a positive pulse at output 84, whereas a pulse through winding 80 will produce a negative pulse at output 84. The output pulses appearing at output 84 constitute the output of the repeater and are suitable for transmission to the next section of transmission line.

I claim

1. In a system for the transmission of information coded in terms of the presence and polarity of pulses in a signal pulse train, a circuit for reconstituting degraded pulses, comprising:

*a.* a source of degraded input pulse signals to be sampled and reshaped;

*b.* diode means connected back-to-back between said input signal source and a point of zero potential;

*c.* means for maintaining at least one or the other of said diode means in forward-biased condition at different potentials of said input pulse signals;

*d.* first, second and third transistor means;

*e.* means connecting the control element of said first transistor means to said input signal source;

*f.* means connecting the control element of said second transistor means to said point of zero potential;

*g.* means connecting the control element of said third transistor means to the interconnection of said diode means;

*h.* said transistor means being connected so as to cause only the transistor means with the highest potential at its base to conduct; and

*i.* sampling pulse source means connected to said transistor means so as to prevent conduction of any of said transistor means except in the presence of a sampling pulse;

whereby said first transistor means conducts during the sampling pulse when the potential of the input signal pulse at the moment of sampling is more positive than a predetermined positive threshold value, said second transistor means conducts when said input signal potential is more negative than a predetermined negative threshold value, and said third transistor means conducts when said input signal potential is between said threshold values, said threshold values being determined by the voltage drop across said diode means.

2. The circuit of claim 1, in which the voltage drop across both of said back-to-back connected diode means is equal for equal currents.

3. In a system for the transmission of information coded in terms of the presence and polarity of pulses in a signal pulse train, a circuit for reconstituting degraded pulses, comprising:

*a.* means for producing exponentially decaying, equall spaced first clock spikes;

*b.* means connected to said first-named means for producing rectangular sampling pulses having a duration equal to a predetermined portion of said first clock spikes;

*c.* a source of degraded input pulse signals to be sampled and reshaped;

*d.* diode means connected back-to-back between said input signal source and a point of zero potential;

*e.* means for maintaining at least one or the other of said diode means in forward-biased condition at different potentials of said input pulse signals;

*f.* first, second and third transistor means;

*g.* means connecting the control element of said first transistor means to said input signal source;

*h.* means connecting the control element of said second transistor means to said point of zero potential;

*i.* means connecting the control element of said third transistor means to the interconnection of said diode means;

*j.* said transistor means being connected so as to cause only the transistor means with the highest potential at its base to conduct;

*k.* the emitter-collector circuits of said transistor means being connected to said sampling pulse producing means so as to allow conduction of said transistor means only in the presence of a sampling pulse;

*l.* fourth and fifth transistor means having their base electrodes connected, respectively, to the emitter-collector circuit of said first and second transistor means;

*m.* a pair of capacitive means connected, respectively, between the base electrode and the emitter-collector circuit of each of said fourth and fifth transistor means;

*n.* a source of second clock spikes displaced from said first clock spikes by a predetermined time interval; and

*o.* sixth and seventh transistor means responsive to said second clock spikes to substantially short-circuit said capacitive means associated with said fourth and fifth transistor means, respectively.

4. In a system for the transmission of information coded in terms of the presence and polarity of pulses in a signal pulse train, a circuit for reconstituting degraded pulses, comprising:

*a.* means arranged to provide a first output triggering current signal of predetermined duration in response to an input signal sample exceeding a predetermined positive voltage level, and a second output triggering current signal of like duration in response to an input signal sample exceeding a predetermined negative voltage level;

*b.* means supplying said triggering current signals, respectively, to the base electrodes of first and second ouput transistor means;

*c.* capacitive means connected between the base electrode and the emitter-collector circuit of each of said transistor means;

*d.* a source of clock spikes non-coincident with said triggering current signals; and

*e.* saturable emitter follower means having their emitter-collector circuit connected across said capacitive means and their base electrode connected to said source of clock spikes so as to provide for substantially instantaneous discharge of said capacitive means and said base electrodes a predetermined time following the onset of said triggering current signals.

* * * * *